Patented Feb. 3, 1953

2,627,498

UNITED STATES PATENT OFFICE 2,627,498

PROCESS FOR OXIDIZING ASPHALT

Dale F. Fink, Wood River, Robert A. Greger, Edwardsville, and Frederick R. Alsberg, East Alton, Ill., assignors to Shell Development Company, San Francisco, Calif., a corporation of Delaware No Drawing. Application September 26, 1949, Serial No. 117,952

7 Claims. (Cl. 196—74)

This invention relates to the manufacture of oxidized or air-blown asphalt from petroleum, petroleum residium and the like.

It is well known that asphalt may be oxidized by blowing with air or other oxygen-containing gas. The air blowing of asphalt and the like has the effect of raising the melting point, lowering the penetration and ductility and also lowering the susceptibility of the asphalt to temperature changes, thus rendering the material particularly suitable for roof coatings, water-proofing and similar purposes.

According to the older method of producing oxidized asphalt, it has been necessary to air blow the substance at a temperature of 375 to 425° F. for a period of 1 to 3 days in order to produce a product having the desired melting point-penetration characteristics. The process of air blowing has been accelerated by the use of Friedel-Crafts catalysts such as ferric chloride, aluminum chloride, boron trifluoride, antimony chloride and the like. The use of such catalysts not only reduces the necessary time of air blowing, but also results in a product having a high penetration index, a property especially desirable in roofing asphalts. The term "penetration index" is an expression relating softening point to penetration. The penetration index formula and its derivation are described in a paper by J. P. Pfeiffer and P. M. Van Doormal, Nat. Pet. News, February 23, 1938, Pg. R-78 to R-84. Combinations of these processes have been made, such as air blowing followed by heating or air blowing in the presence of the oxidation catalyst. Even if a catalyst of the type described is employed, the time of air blowing to reach a given penetration index becomes quite extended and may amount to 6 to 10 hours to reach a penetration of 220 to 260.

It is an object of the present invention to provide an improved process for the blowing of asphalts and petroleum residiums. It is another object of the present invention to provide an improvement in the catalytic air blowing of asphalts. It is a further object of the present invention to provide a means for reducing the necessary blowing time to reach a given penetration or softening point. Other objects will become apparent during the following discussion.

Now, in accordance with the present invention, it has been found that the time necessary for catalytic blowing of asphalt may be materially shortened by preceding the oxidation period with a preheating period in the presence of a metal halide catalyst but in the substantial absence of air or other oxygen-containing gas. Still, in accordance with the present invention, an unaccountable increase of penetration index occurs when petrolatum is present in the mixture which is preheated and then oxidized.

The catalysts which are especially useful in the process of the present invention include Friedel-Crafts catalysts containing metals capable of a valence change. The chlorides are preferred, but other halides such as the bromides, iodides or fluorides may be used. The halides of the preferred metals include those of iron, antimony, zirconium, titanium, arsenic, zinc, tin, copper and manganese. The most active catalysts of the above group are the ferric halides and particularly ferric chloride. These catalysts may be used either in the form of the anhydrous salt or of their hydrates. The amount of catalyst to be used may be determined by test, since asphalts from varying sources exhibit differing responses both to oxidation and to the presence of the catalysts recited. Usually, the concentration will vary from 0.1 to 5% of the catalyst by weight of the asphalt. Preferably, the weight of the catalyst will be from 0.2 to 2%, expressed in terms of the anhydrous metallic halide and not on the basis of hydrated salts.

The salt may be incorporated in the asphalt by any suitable means which effectively disperses the salt throughout the body of the asphalt being treated. Accordingly, a concentrated aqueous solution of the salt may be added to the asphalt in the presence or absence of a diluent for the latter, preferably with stirring, while the asphalt is being heated to a temperature somewhat above its softening point.

The asphalts which may be employed in the present process are normally those which are used in the preparation of roofing grade asphalts. These are variously known as petroleum residues, petroleum asphalts, petroleum residuums, and by similar terms denoting the heaviest fractions present in a crude oil. The asphalt may be one obtained by removal of volatile constituents, by distillation, or may be isolated by precipitation methods usually known as "propane deasphalting." The asphalt may be blended with a thinner although this may be added after the preheating and oxidizing operations. The amount of thinner to be added to the asphalt will be determined entirely on the fluidity desired and will vary according to the specific application for which the asphalt is intended. However, the type or amount of thinner used for this purpose does not comprise an essential phase of the present invention. Some typical properties of two suitable blowing stocks are tabulated below:

| Crude Source | West Texas | Louisiana |
|---|---|---|
| Softening Point, ° F. (R. and B.) | 94 | 104 |
| Penetration at 77° F., 100 g., 5 sec. | 300+ | 193 |
| Viscosity, S. F. at 210° F., secs. | 505 | 1100 |
| Flash Point, COC, ° F. | 590 | 540 |
| Sp. Grav. at 60° F. | 0.996 | 1.025 |

The preheating period constituting the essential inventive step in the present process comprises heating the asphalt petrolatum, and catalyst prior to oxidation. It has been found, as data given hereinafter will show, that the preheating period substantially reduces the necessary time of oxidation to reach a given penetration or softening point. Depending upon the temperature of preheating, the concentration of the catalyst employed and the source and nature of the asphalt being treated, the time of preheating may vary from about one-half hour to as much as two weeks, although the preheating time is preferably from 1 to 10 hours.

The temperature of preheating is generally between the softening point of the asphalt and a temperature at which the asphalt shows evidence of decomposition or loss of volatile constituents. Usually this temperature range will be between 150 and 600° F., although the preferred temperature range is between 175 and 300° F. It is unnecessary to introduce oxygen during the preheating period and preferably it is omitted, the only oxygen present being that which naturally fills the empty space in the kettle or autoclave employed for heating purposes.

The time of preheating may be materially shortened by using agitation during a substantial part of the heating period. It has been found, for example, that about the same effect is gained by heating the asphalt and catalyst without stirring for a period of two weeks as is obtained by stirring the catalyst and asphalt at the same temperature for six hours. Following the preheating period, the asphalt still containing the catalyst (or the products of its interaction with asphalt constituents during preheating) is subjected to air blowing or to the treatment with oxygen or an oxygen-containing gas. Usually the temperature of air blowing may vary from 325 to 550° F. and will extend for a period from about one-half hour to twenty four hours. Ordinarily, the air blowing may be conducted at temperatures between 350 and 475° F. for a period of 1 to 10 hours. While auxiliary stirring may be used during the air blowing operation, agitation is usually obtained by passing the air under pressure through the asphalt.

An essential phase of the present invention comprises modifying the asphalt previous to oxidation by the addition thereto of 2 to 20 parts by weight of petrolatum for every 100 parts of the mixture of asphalt and petrolatum. The presence of petrolatum has been found to result in a product having a substantially increased penetration index. An unexpected feature of this addition comprises the apparently synergistic effect of preheating a mixture of petrolatum and asphalt in the presence of a Friedel-Crafts catalyst such as ferric chloride and following this period by the air blowing operation as described above. The penetration index obtained by treatment of mixtures of asphalt and petrolatum in the presence of catalysts is substantially higher than that of asphalt air-blown in the presence of one or the other of the two modifiers, namely, petrolatum or Friedel-Crafts catalyst.

The "petrolatum" described herein may be obtained during the operation of dewaxing heavy residues suitable for processing to lubricating oils. In a typical process, a topped deasphalted Mid-Continent crude is chilled in the presence of several parts of liquid propane and the material which crystallizes out is separated from the liquid oil components by rotary filters. The filter cake, after removal of propane, is termed "petrolatum." Typical properties of this material are:

| | |
|---|---|
| Sp. Grav. at 60° F. | 0.910 |
| M. P., ASTM 127-30, °F. | 146 |
| Flash point, °F. | 570 |
| Viscosity SSU: | |
| At 210° F. | 132 |
| At 250° F. | 82 |

The distinguishing chemical characteristic of the stocks suitable in our process is their relatively low content of heavy resinous substances which are normally concentrated in heavy residues. The typical components range from highly crystalline, light colored slack waxes on the one hand to dark, amorphous, plastic waxes on the other. For example, the two petrolatum samples having the properties listed below are equally effective in the process of the present invention.

EXAMPLE

The following tests were performed to indicate the improvement obtained by preheating and subsequently oxidizing asphalt containing not only ferric chloride but also petrolatum. It was found, as stated hereinbefore, that a synergistic effect was discovered in the penetration of the sample obtained by preheating and air blowing in the presence of these two modifiers which was not obtained when either one of the modifiers was used in the absence of the other. A West Texas-Kansas Healdton asphalt was air-blown at 475° F. to reach 220° softening point. The data obtained and the time necessary to reach this softening point are given in the table below under item 1. A sample of this same asphalt was stored at 300° F. for 6 hours with stirring with 0.25% ferric chloride hexahydrate following which the same was oxidized at 475° F. Item 2 in the table gives the data obtained on this sample. A quantity of the original asphalt was air-blown at 475° F. with 6% petrolatum. Item 3 in the table gives the data obtained. Finally, a sample of the original asphalt was heated at 300° F. with stirring in the presence of 6% petrolatum and 0.25% ferric chloride hexahydrate following which the sample was air-blown at 475° F. See item 4 in the table for the data obtained.

TABLE

Combination effect of $FeCl_3/6H_2O$ and short residue petrolatum on flasher bottoms

| Material Oxidized | Preoxidation Treatment | Hrs. Req. to Blow, Initial to 220° S. P. | Pen. at 77° F. at 200° S. P. | Pen. Index |
|---|---|---|---|---|
| 1. Flasher Bottoms Asphalt | None | 10.2 | 13 | +4.1 |
| 2. Item 1+¼% $FeCl_3.6H_2O$ | 6 Hr. Storage at 300° F. | 4.0 | 14 | +4.3 |
| 3. Item 1+6% Petrolatum | None | 8.1 | 16 | +4.5 |
| 4. Item 3+¼% $FeCl_3.6H_2O$ | Mixed 6 Hrs. at 300° F. | 4.0 | 21 | +5.1 |
| 5. Plant Blend Containing 6.1% Petrolatum. | None | 7.8 | 14 | +4.3 |
| 6. Item 5+¼% $FeCl_3.6H_2O$ | Mixed 6 Hrs. at 250° F. | 3.1 | 20 | +5.0 |

We claim as our invention:

1. The method of treating an asphaltic residuum which comprises preheating a mixture of 80 to 98 parts by weight of said residuum with 2 to 20 parts by weight of petrolatum at a temperature of 200 to 350° F. for a period of 1 to 10 hours in the substantial absence of air but in the presence of 0.2 to 2% by weight of ferric chloride and subsequently air blowing the preheated material at a temperature of 350 to 475° F. for 1 to 10 hours.

2. The method of treating an asphaltic residuum which comprises preheating a mixture of 80 to 98 parts by weight of said residuum with 2 to 20 parts by weight of petrolatum at a temperature of 200 to 350° F. for a period of 1 to 10 hours in the substantial absence of air but in the presence of 0.2 to 2% by weight of antimony trichloride and subsequently air blowing the preheated material at a temperature of 350 to 475° F. for 1 to 10 hours.

3. The method of treating a mixture of asphaltic residuum and petrolatum which comprises preheating a mixture of 80 to 98 parts by weight of residuum with 2 to 20 parts by weight of petrolatum at a temperature of 150 to 600° F. for a period of 0.5 to 336 hours in the substantial absence of oxygen but in the presence of 0.2 to 2% by weight of the mixture of ferric chloride and subsequently air blowing said preheated mixture and chloride at a temperature of 350 to 475° F. for 1 to 10 hours.

4. The method of treating a mixture of asphaltic residuum and petrolatum which comprises preheating said mixture at a temperature of 150 to 600° F. for 0.5 to 336 hours in the substantial absence of oxygen but in the presence of 0.1 to 5% by weight of a ferric halide catalyst and subsequently air blowing said preheated mixture and catalyst at a temperature of 325 to 550° F. for 0.5 to 24 hours.

5. The method of treating an asphaltic residuum which comprises preheating a mixture of 80 to 98 parts by weight of said residuum with 2 to 20 parts by weight of petrolatum at a temperature of 150 to 600° F. for 0.5 to 336 hours in the substantial absence of oxygen but in the presence of 0.1 to 5% by weight of a Friedel-Crafts catalyst and subsequently air-blowing the preheated material at a temperature of 325 to 550° F. for 0.5 to 24 hours.

6. The method of treating a hydrocarbon of high molecular weight to produce an asphaltic product which comprises preheating a mixture of 80 to 98 parts by weight of said hydrocarbon with 2 to 20 parts by weight of petrolatum in the substantial absence of oxygen but in the presence of added portions of a Friedel-Crafts catalyst, said catalyst being a halide of a metal capable of valence change said preheating being conducted at a temperature between 150 and 600° F. for a period from 0.5 hour to two weeks and subsequently commingling said preheated material with an oxygen-containing gas at an elevated oxidizing temperature.

7. The method of treating a mixture of asphaltic residuum and petrolatum which comprises preheating said mixture at a temperature of 200° to 350° F. for about 6 hours in the substantial absence of oxygen but in the presence of 0.1 to 5% by weight of ferric chloride and subsequently air blowing said preheated mixture and chloride at a temperature of 350° to 475° F. for 1 to 10 hours.

DALE F. FINK.
ROBERT A. GREGER.
FREDERICK R. ALSBERG.

REFERENCES CITED

The following references are of record in the file of this patent:

UNITED STATES PATENTS

| Number | Name | Date |
| --- | --- | --- |
| 1,782,186 | Abson | Nov. 18, 1930 |
| 2,272,866 | Burk et al. | Feb. 10, 1942 |
| 2,281,728 | Thelen | May 5, 1942 |